(12) United States Patent
Langseth et al.

(10) Patent No.: US 9,389,909 B1
(45) Date of Patent: Jul. 12, 2016

(54) PRIORITIZED EXECUTION OF PLANS FOR OBTAINING AND/OR PROCESSING DATA

(71) Applicant: Zoomdata, Inc., Reston, VA (US)

(72) Inventors: Justin Langseth, Great Falls, VA (US); Jorge Alarcon, Fairfax, VA (US); Ruhollah Farchtchi, Vienna, VA (US); Farzad Aref, McLean, VA (US)

(73) Assignee: ZOOMDATA, INC., Reston, VA (US)

( * ) Notice: Subject to any disclaimer, the term of this patent is extended or adjusted under 35 U.S.C. 154(b) by 0 days.

(21) Appl. No.: 14/698,421

(22) Filed: Apr. 28, 2015

(51) Int. Cl.
G06F 9/46 (2006.01)
G06F 9/48 (2006.01)
G06F 9/50 (2006.01)

(52) U.S. Cl.
CPC ............ G06F 9/4818 (2013.01); G06F 9/5011 (2013.01)

(58) Field of Classification Search
None
See application file for complete search history.

(56) References Cited

U.S. PATENT DOCUMENTS

| | | | |
|---|---|---|---|
| 4,769,772 A | 9/1988 | Dwyer | 364/300 |
| 6,026,397 A | 2/2000 | Sheppard | 707/5 |
| 6,072,493 A | 6/2000 | Driskell et al. | 345/356 |
| 6,505,246 B1 | 1/2003 | Land et al. | 709/224 |
| 6,633,873 B1 | 10/2003 | Nakamura | 707/10 |
| 6,829,583 B1 * | 12/2004 | Knapp et al. | 705/5 |
| 7,340,409 B1 | 3/2008 | Ulwick | 705/10 |
| 7,673,278 B2 | 3/2010 | Rathsack et al. | 716/19 |
| 7,688,322 B2 | 3/2010 | Kapler et al. | 345/440 |
| 7,761,324 B2 | 7/2010 | Amerasinghe et al. | 705/10 |
| 7,814,042 B2 | 10/2010 | Ahmed | 707/2 |
| 8,046,478 B1 * | 10/2011 | Ogdon et al. | 709/229 |
| 8,122,223 B2 | 2/2012 | Cantin et al. | 711/204 |
| 8,489,982 B2 | 7/2013 | Davis | 715/212 |
| 8,521,574 B1 | 8/2013 | Rajan et al. | 705/7.11 |
| 8,542,117 B1 | 9/2013 | Miasnik et al. | 340/540 |
| 8,566,788 B2 | 10/2013 | Snodgrass et al. | 717/109 |
| 8,631,325 B1 * | 1/2014 | Langseth et al. | 715/718 |
| 8,938,688 B2 | 1/2015 | Bradford et al. | 715/789 |
| 2002/0052908 A1 * | 5/2002 | Cho et al. | 709/102 |
| 2002/0091994 A1 | 7/2002 | McCready et al. | 717/124 |
| 2003/0225644 A1 | 12/2003 | Casati et al. | 705/35 |
| 2004/0193631 A1 | 9/2004 | Kumashio | 707/100 |
| 2004/0225643 A1 * | 11/2004 | Alpha et al. | 707/3 |
| 2006/0041537 A1 * | 2/2006 | Ahmed | G06F 17/3097 |

(Continued)

FOREIGN PATENT DOCUMENTS

WO   WO 2014/011708   1/2014

OTHER PUBLICATIONS

Bennett et al., "Feature-Based Statistical Analysis of Combustion Simulation Data", IEEE Transactions on Visualization and Computer Graphics, vol. 17, No. 12, Dec. 2011, pp. 1822-1831 (10 pages).

(Continued)

*Primary Examiner* — Emerson Puente
*Assistant Examiner* — Mehran Kamran
(74) *Attorney, Agent, or Firm* — Pillsbury Winthrop Shaw Pittman LLP

(57) ABSTRACT

Systems and methods of prioritizing execution of plans for obtaining and/or processing data based on partial execution of the plans are presented herein. In certain implementations, one or more plans may be executed. Costs associated with individual ones of the plans may be estimated based on partial execution of respective ones of the plans. Based on a comparison between the estimated costs, the execution of at least one of plans may be prioritized over at least the execution of the other ones of the plans.

24 Claims, 7 Drawing Sheets

(56) References Cited

U.S. PATENT DOCUMENTS

| | | | |
|---|---|---|---|
| 2006/0293872 A1 | 12/2006 | Zamora et al. | 703/10 |
| 2007/0027671 A1* | 2/2007 | Kanawa | 704/4 |
| 2007/0073658 A1* | 3/2007 | Faerber et al. | 707/3 |
| 2007/0208607 A1 | 9/2007 | Amerasinghe et al. | 705/10 |
| 2007/0226186 A1* | 9/2007 | Ewen et al. | 707/3 |
| 2007/0282794 A1* | 12/2007 | Barsness et al. | 707/2 |
| 2008/0071748 A1* | 3/2008 | Wroblewski et al. | 707/3 |
| 2008/0155386 A1* | 6/2008 | Jensen | 715/201 |
| 2009/0077013 A1* | 3/2009 | Hu et al. | 707/2 |
| 2009/0100004 A1* | 4/2009 | Andrei et al. | 707/2 |
| 2009/0144103 A1 | 6/2009 | Malov et al. | 705/7 |
| 2009/0259522 A1 | 10/2009 | Rapperport et al. | 705/10 |
| 2009/0281986 A1* | 11/2009 | Bestgen et al. | 707/2 |
| 2009/0281992 A1* | 11/2009 | Bestgen et al. | 707/3 |
| 2009/0287814 A1 | 11/2009 | Robertson et al. | 709/224 |
| 2009/0300544 A1 | 12/2009 | Psenka et al. | 715/810 |
| 2009/0322755 A1 | 12/2009 | Holm-Peterson et al. | 345/440 |
| 2009/0327216 A1* | 12/2009 | Brown et al. | 707/2 |
| 2009/0327242 A1* | 12/2009 | Brown et al. | 707/3 |
| 2010/0153429 A1 | 6/2010 | Xu et al. | 707/769 |
| 2010/0162152 A1 | 6/2010 | Allyn et al. | 715/767 |
| 2010/0198855 A1* | 8/2010 | Ranganathan et al. | 707/764 |
| 2010/0250310 A1* | 9/2010 | Locherer | 705/7 |
| 2010/0306188 A1* | 12/2010 | Cunningham et al. | 707/713 |
| 2011/0010361 A1* | 1/2011 | Burger et al. | 707/719 |
| 2011/0137896 A1 | 6/2011 | Masunaga et al. | 707/723 |
| 2011/0145221 A1* | 6/2011 | Kim et al. | 707/718 |
| 2011/0202841 A1 | 8/2011 | Dempster et al. | 715/716 |
| 2012/0030220 A1* | 2/2012 | Edwards et al. | 707/754 |
| 2012/0047158 A1* | 2/2012 | Lee et al. | 707/759 |
| 2012/0089920 A1 | 4/2012 | Eick | 715/739 |
| 2012/0095989 A1* | 4/2012 | Lakshminarayan et al. | 707/718 |
| 2012/0151399 A1 | 6/2012 | Soerensen et al. | 715/769 |
| 2012/0185735 A1* | 7/2012 | Sambamurthy et al. | 714/47.1 |
| 2012/0203762 A1* | 8/2012 | Kakarlamudi et al. | 707/718 |
| 2012/0271748 A1 | 10/2012 | DiSalvo | 705/37 |
| 2012/0299965 A1 | 11/2012 | Agarwal et al. | 345/660 |
| 2013/0083031 A1 | 4/2013 | Lehnherr et al. | 345/440 |
| 2013/0086039 A1* | 4/2013 | Salch et al. | 707/717 |
| 2013/0097599 A1* | 4/2013 | Konik et al. | 718/1 |
| 2013/0159283 A1* | 6/2013 | Broll et al. | 707/716 |
| 2013/0262436 A1* | 10/2013 | Barsness | G06F 17/30463 707/718 |
| 2013/0268520 A1 | 10/2013 | Fisher et al. | 707/723 |
| 2013/0290298 A1* | 10/2013 | Weyerhaeuser et al. | 707/719 |
| 2013/0304798 A1 | 11/2013 | Chang et al. | 709/203 |
| 2014/0258382 A1* | 9/2014 | Tomer et al. | 709/203 |
| 2014/0358634 A1 | 12/2014 | Schnabl et al. | 705/7.31 |
| 2015/0032768 A1* | 1/2015 | Miller et al. | 707/769 |
| 2015/0046449 A1 | 2/2015 | Langseth et al. | 707/736 |
| 2015/0046815 A1 | 2/2015 | Langseth et al. | 715/718 |
| 2015/0112965 A1* | 4/2015 | Tokuda et al. | 707/718 |
| 2015/0112966 A1* | 4/2015 | Tokuda et al. | 707/718 |
| 2015/0149435 A1* | 5/2015 | McKenna et al. | 707/714 |
| 2015/0154256 A1* | 6/2015 | McKenna et al. | 707/714 |

OTHER PUBLICATIONS

Keim et al., "Information Visualization and Visual Data Mining", IEEE Transactions on Visualization and Computer Graphics, vol. 8, No. 1, Jan.-Mar. 2002, pp. 1-8.

Kandel et al., "Enterprise Data Analysis and Visualization: An Interview Study", IEEE Transactions on Visualization and Computer Graphics, vol. 18, No. 12, Dec. 2012, pp. 2017-2026 (10 pages).

Pham et al., "Visualization of Diversity in Large Multivariate Data Sets", IEEE Transactions on Visualization and Computer Graphics, vol. 16, No. 6, Nov./Dec. 2010, pp. 1053-1062 (10 pages).

Rubel et al., "Integrating Data Clustering and Visualization for the Analysis of 3D Gene Expression Data", IEEE/ACM Transactions on Computational Biology and Bioinformatics, vol. 7, No. 1, Jan.-Mar. 2010, pp. 64-79 (16 pages).

Yu et al., "Visual Mining of Multimedia Data for Social and Behavioral Studies", IEEE Symposium on Visual Analytics Science and Technology, Oct. 21-23, 2008, pp. 155-162 (8 pages).

* cited by examiner

PRIORITIZED EXECUTION OF PLANS FOR OBTAINING AND/OR PROCESSING DATA

FIELD OF THE INVENTION

The invention relates generally to prioritizing execution of plans for obtaining and/or processing data from one or more data sources.

BACKGROUND OF THE INVENTION

In recent years, data visualization has become an increasing important part of data analysis. Visualization, for example, enables companies and other organizations to meaningfully present raw data to facilitate effective and efficient analysis of the data. Obtaining and/or processing the raw data to produce a visualization of the data, however, can be a challenge. When visualizing "big data," for example, the costs related to obtaining and/or processing all of the data may be substantial. While advances in the performance of computer hardware has greatly increased the capabilities of servers and networks to obtain and process data, the amount of data available to be obtained and processed has grown exponentially in comparison to any advances in hardware performance. Although a plan (e.g., a query plan) for obtaining and/or processing data may be optimized for one or more scenarios, it may not be optimal for other scenarios. In addition, a number of variables may affect the speed and/or efficiency of the plan, causing the execution of the plan to be more costly than anticipated. These and other drawbacks exist.

SUMMARY OF THE INVENTION

The invention addressing these and other drawbacks relates to methods, apparatuses, and/or systems for prioritizing execution of plans for obtaining data from one or more data sources and/or processing the obtained data. The prioritization may be based on estimated plan execution costs (e.g., time-related costs, monetary costs, etc.), and/or other prioritization factors. Cost, for example, may be calculated/estimated for a plan based on the amount of system resources to execute the plan (e.g., processing power, random access memory space, non-volatile storage space, network resources, or other resources), latency, throughput, or monetary costs associated with obtaining data from/via one or more data sources or networks from/through which the plan indicates data is to be obtained, time or monetary costs associated with processing obtained data using operations of the plan (e.g., query operations or other operations), or other cost criteria.

In certain implementations, one or more plans for obtaining results related to data sets from one or more data sources and/or processing the obtained data may be determined. The plans may be executed in parallel or in sequence before prioritization. In certain implementations, costs may be estimated based on partial execution of the plans. Partial execution may be used to determine factors that may contribute to cost such as net latency to a data source, net throughput to and/or from a data source, and/or other performance qualities associated with a data source and/or a particular plan. The estimated cost determined from partial execution of one or more plans may be compared against one another to determine the plan (or plans) with the comparatively lowest cost. Based on the comparison, a determination may be made to either continue (e.g., prioritize) execution of a given (low cost) plan or to suspend or cancel another given (high cost) plan. The prioritization may facilitate minimizing delay in returning results for presentation to a user.

In certain implementations, multiple plans may be related to obtaining results related to a common data set. Prioritization may facilitate returning results related to the data set at the lowest cost (e.g., least amount of delay).

In certain implementations, multiple plans may be related to obtaining results related to different data sets. In such implementations, prioritization of the plans may cause results related to a given data set to be returned sooner than results related to one or more other data sets.

In certain implementations, multiple plans may be related to obtaining results related to data from a common data source. Individual ones of the plans may utilize different paths for obtaining data from the common data source. Prioritization may be related to determining the plan with the lowest cost path.

In certain implementations, plans may be related to obtaining results related to data from one or more data sources (e.g., a distributed network of data sources). Prioritization may cause results related to a data set from a given data source to be obtained before results related to a data set from a different data source.

These and other features of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

The invention is illustrated by way of example, and not by way of limitation, in the figures of the accompanying drawing and in which like reference numerals refer to similar elements.

DETAILED DESCRIPTION OF THE INVENTION

In the following description, for the purposes of explanation, numerous specific details are set forth in order to provide a thorough understanding of the implementations of the invention. It will be appreciated, however, by one skilled in the art that the implementations of the invention may be practiced without these specific details or with an equivalent arrangement. In other instances, well-known structures and devices are shown in block diagram form in order to avoid unnecessarily obscuring the implementations of the invention. It should be noted that features (e.g., components, operations, or other features) described herein may be implemented separately or in combination with one another.

Figure 1:
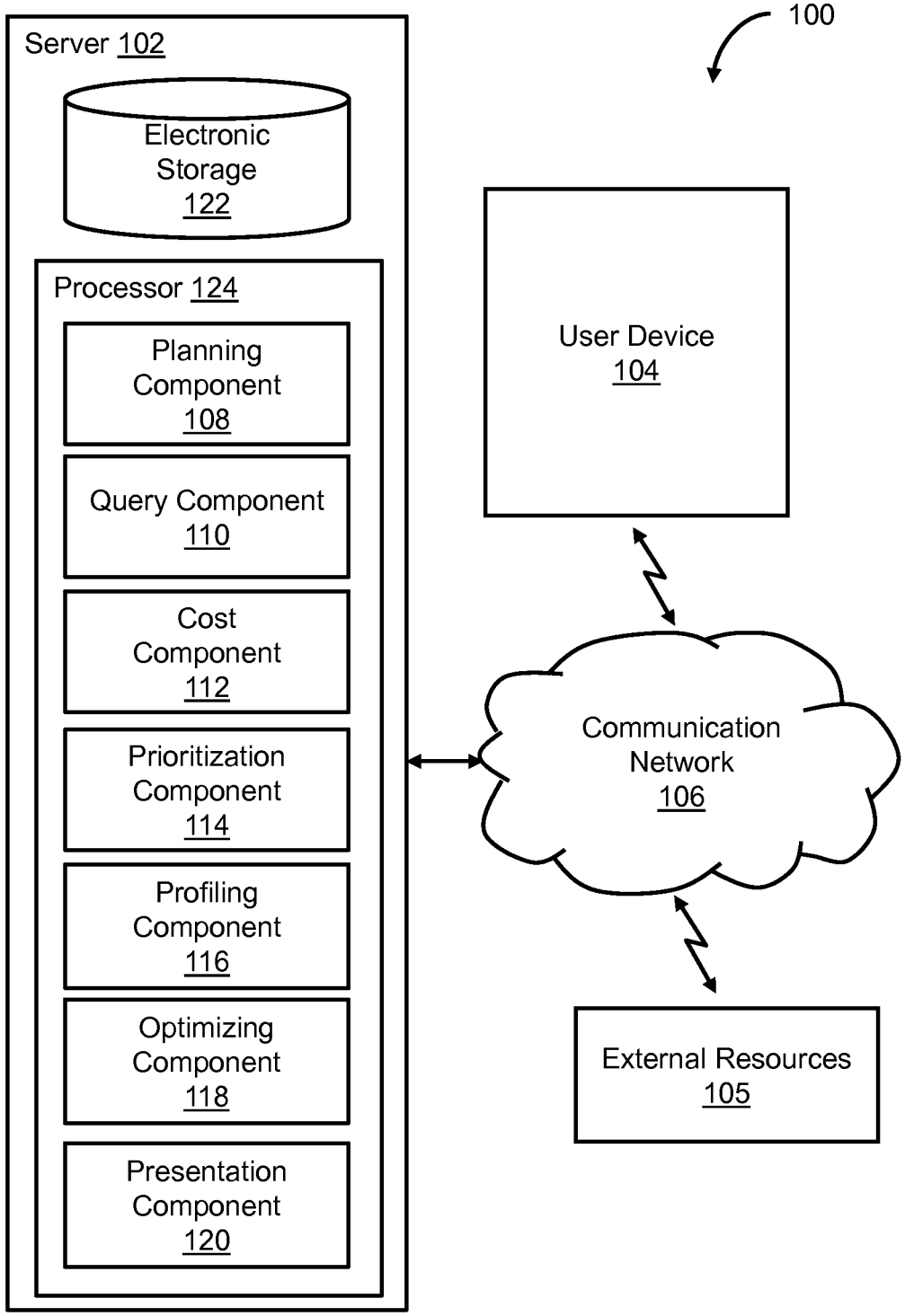
FIG. 1 illustrates a diagram of a system for prioritizing execution of plans for obtaining and/or processing data based on partial execution of the plans, in accordance with one or more implementations.

FIG. 1 illustrates a diagram of a system 100 for prioritizing execution of plans for obtaining data from one or more data sources and/or processing the obtained data, in accordance with one or more implementations. System 100 may comprise one or more servers 102. Server 102 (or servers 102) may be configured to communicate with one or more user device 104 according to a client/server architecture (e.g., over communication network 106 or via other communication medium). Users may access system 100 via user devices 104.

Server 102 may be programmed to execute one or more computer program components to facilitate prioritization of plans for obtaining and/or processing of data. The computer program components may include a planning component 108, a query component 110, a cost component 112, a prioritization component 114, a profiling component 116, an optimizing component 118, a presentation component 120, and/or other components.

In an implementation, server 102 may be programmed to prioritize execution of plans for obtaining and/or processing data based on partial execution of the plans. In some implementations, the planning component 108 may be programmed to determine one or more plans for obtaining data from one or more data sources and/or processing the obtained data. The plans may be based on a request for values associated with one or more attributes. A value may be associated with one or more attributes (e.g., an object, an entity, a property, a characteristic, etc.). Estimated values may be presented to a user and updated as queries are performed and data is obtained and/or processed. The presentation component 120 may be programmed to effectuate presentation of a data visualization user interface (e.g., at user devices 104). The data visualization user interface may be programmed to receive entry and/or selection by users of a first attribute group (associated with first attributes), a second attribute group (associated with second attributes), and/or other information. The user entry and/or selection may correspond to a request for values. The data visualization user interface may be programmed to present (predicted, updated, and/or calculated) values associated with a set of attributes (or a representation thereof) based on the request and corresponding queries. In particular, each query associated with a plan may return a data set from which the requested values may be calculated. In order to return results to the user as soon as possible, the values may be estimated based on an initial query and updated as additional queries are performed. In certain implementations, quickly returning results to a user may be of high priority. As such, one or more implementations of the system 100 presented herein may facilitate prioritizing plans such that results may be returned with minimized delay in data retrieval and/or processing.

Figure 5:
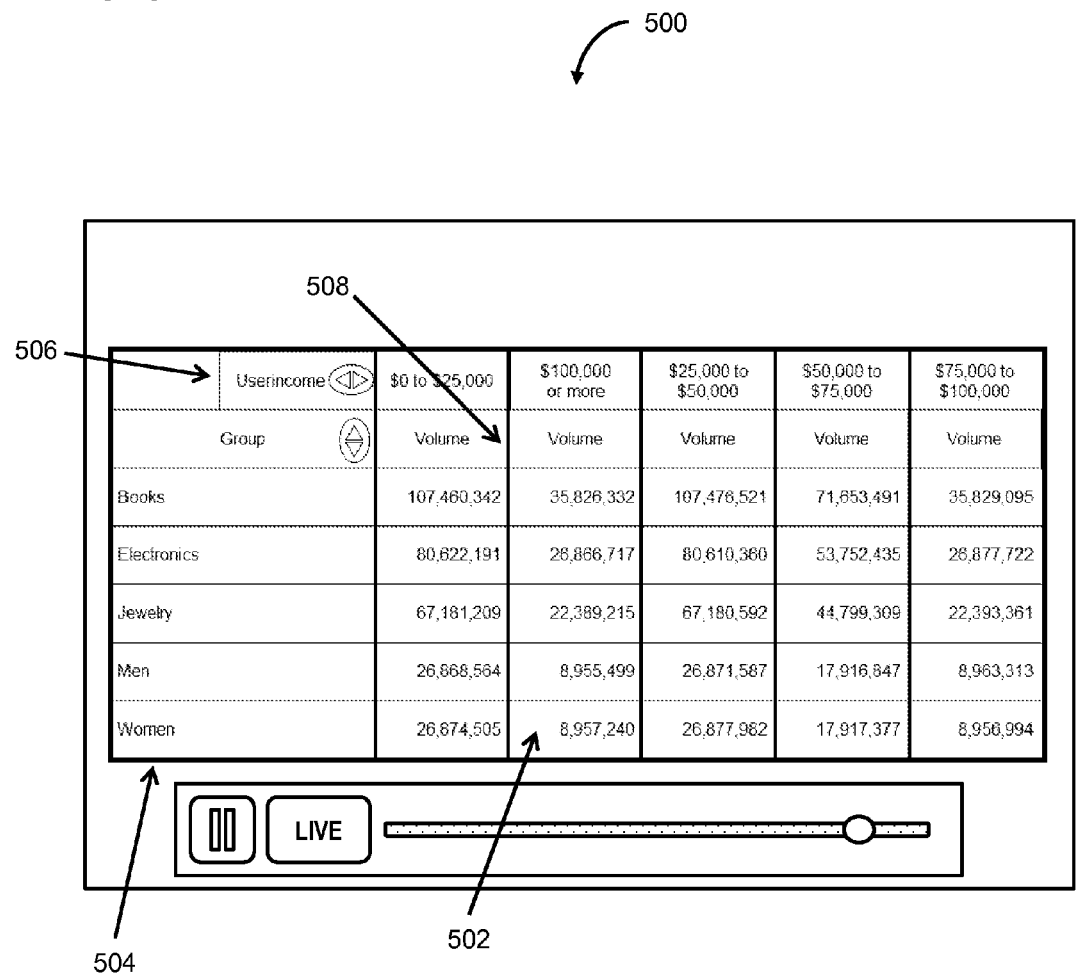
FIG. 5 illustrates a data visualization user interface, in accordance with one or more implementations.

In some implementations, a data visualization user interface provided by presentation component 120 may be in the form of a pivot table (or other display style). As an example, with respect to FIG. 5, a data visualization user interface 500 is depicted. The data visualization user interface 500 may include a data element section 502 corresponding to calculated values, a first attribute section 504, a second attribute section 506, a third attribute section 508, and/or other sections. Values represented in data element section 502 may each be associated with at least one attribute represented in the first attribute section 504 (e.g., labeled "Group"), at least one attribute represented in the second attribute section 506 (e.g., labeled "User Income"), and at least one attribute represented in the third attribute section 508 (e.g., labeled "Volume"). It is noted that the depiction of data visualization user interface 500 in FIG. 5 is intended for illustrative purposes only and is not to be considered limiting. In other implementations, data may be displayed by other display styles. Display styles may comprise a pivot table, a bar chart, a bubble graph, a pie chart, a scatter plot, a word cloud, a zoomable map, and/or other display style.

Returning to FIG. 1, the query component 110 may be programmed to execute plans for obtaining and/or processing data. As an example, if the plans comprise one or more queries, the query component 110 may initiate at least one of the queries. The queries may be performed over one or more query intervals (e.g., based on data sources, time periods, geographic areas, etc.). As an non-limiting example, responsive to a user request for a visualization of values associated with a first, second, and third attribute (e.g., overall sales volume of various product categories) for a time period (e.g., during a particular year), at least a first query plan and a second query plan may be determined for execution (where each plan may comprise one or more queries). The first and second query plans may be executed in series or in parallel before prioritization.

In certain implementations, one or more plans may comprise instructions for obtaining results related to a common data set from a common data source. By way of non-limiting example, a first plan may comprise obtaining results related to a data set from a data source. A second plan may also comprise obtaining results related to the data set from the data source. In some implementations, the first and second plan may have the same, similar, or different paths to obtain the results. By way of non-limiting example, the first and second plans may both utilize a first path to obtain results. As another example, the first plan may utilize the first path to obtain results related to the data set, while the second plan may utilize a second path different than the first path to obtain results related to the data set (e.g., the first plan may not utilize the second path and the second plan may not utilize the first path). A path utilized by a plan may, for example, comprise nodes (e.g., hosts or other nodes) and/or one or more connections between the nodes. The first path may comprise a first set of nodes and/or connections, while the second path may comprise a second set of nodes and/or connections that are different than the first set of nodes and/or connections. In one use case, for example, one plan may comprise utilizing networks in France to obtain data from one or more data sources in Africa, and another plan may utilize networks in Germany (e.g., in lieu of the networks in France) to obtain data from the data sources in Africa.

In certain implementations, one or more plans may comprise obtaining results related to a common data set from different data sources. By way of non-limiting example, a first plan may comprise obtaining results related to a data set from a first data source. A second plan may comprise obtaining results related to the data set from a second data source.

In certain implementations, different plans may comprise obtaining results related to a common data set from data sources that may be accessed in different orders. By way of non-limiting example, a first plan may comprise obtaining results from a first data source before obtaining results related to the data set from one or more other data sources. A second plan may comprise obtaining results from a second data source before obtaining results related to the data set from one or more other data sources. In some implementations, the first plan may comprise obtaining results related to a data set from a data source that is not utilized in the second plan for obtaining results related to the data set.

In certain implementations, one or more plans may comprise obtaining different results related to different data sets. By way of non-limiting example, a first plan may comprise obtaining results related to a first data set from one or more data sources. A second plan may comprise obtaining results related to a second data set different from the first data set from one or more data sources. The data sets may be obtained from the same or different one or more data sources.

In certain implementations, the query component 110 may be programmed to partially execute plans for obtaining and/or processing data. This may include performing some percentage of the queries operations associated with each plan. In some implementations, the query component 110 may be programmed to obtain data associated with the partial execution of the plans. The query component 110 may be programmed to process the obtained data and return results to update a presentation to a user via presentation component 120.

The cost component 112 may be programmed to estimate costs associated with full execution of the plans based on partial execution of the plans. In general, cost may correspond to a delay in obtaining and/or processing a data set and/or a delay in returning results related to a data set to update a presentation to a user. In certain implementations, a system clock (not shown) may monitor the time between the start of the execution of a plan and when results are returned and/or a presentation is updated.

In certain implementations, based on partial executions of a plan, a cost (e.g., delay) in returning results from the partial executions may be determined. The cost associated with the partial execution may be used to estimate a cost associated with full execution of the plan. For example, partial execution of a plan may comprise execution of a certain percentage of the plan (e.g., a predetermined portion of the plan). In certain implementations, the cost associated with returning results from the partial execution may be extrapolated to estimate a cost for full execution based on the percentage of partial execution.

It is noted that estimating full execution cost by extrapolating from a partial execution cost may be performed in a variety of ways. In certain implementations, the relationship between percentage of execution of a plan and the cost for the partial execution may be known. For example, a relationship may be some linear, non-linear, and/or other type of relationship. In other implementations, the relationship between percentage of execution of a plan and the cost for the partial execution may be unknown. In such cases, an initial "guess" of the relationship may be used for extrapolating the partial execution cost to determine the full execution cost. By way of non-limiting example, in its simplest form the estimation may be based on a linear relationship between the partial execution cost and percentage of partial plan execution. Once a plan is executed and actual cost determined, the actual cost and the estimated cost may be compared and/or the relationship may be refined. Over time, the cost component 112 may be programmed to redefine relationships such that the estimations may more accurately represent the actual costs.

In certain implementations, it may be determined that a relationship between percentage of execution of a plan and the cost for the partial execution is a higher order function. For example, in certain implementations, the cost of execution of a plan may in increase (or decrease) non-lineally (e.g., exponentially or other function) based on some contributing factor as more of the plan is executed. Cost contributing factors may include one or more of the use and/or allocation of system resources during execution of a plan (e.g., processing power, random access memory space, non-volatile storage space, network resources, or other resources), performance of a given data source (e.g., latency and/or throughput), performance of network connection, physical location of a given data source, the operations of a given plan, an organization of a given plan, and/or other cost contributing factor.

The prioritization component 114 may be programmed to compare the estimated costs of the plans with one another. The prioritization component 114 may be programmed to prioritize execution of one or more of plans over at least the execution of the other plans based on the comparison. In general, a plan (or plans) that may be indicated by the comparison as having a comparatively lower cost may be prioritized over plans with comparatively higher costs. Herein a plan which is determined to have a lower cost and subject to prioritization may be referred to as a "prioritized plan" while a plan with a higher cost that may not (at least initially) be subject to prioritization may be referred to as a "non-prioritized plan."

The prioritization component 114 may be programmed to, based on the prioritization, continue execution of one or more prioritized plans. This may include performing, via the query component 110, the remaining unexecuted portions of a prioritized plan (e.g., from the point where partial execution of the plan had ended). The prioritization component 114 may be programmed to, based on the prioritization, suspend or cancel the execution of remaining unexecuted portions of non-prioritized plans.

The query component 110 may be programmed to obtain and/or process data from the continued execution of a prioritized plan (or plans). The query component 110 may be programmed to obtain results (e.g., calculate and/or update values) based on the obtained and/or processed data. The query component 110 may be programmed to provide the results to the presentation component 120 for presentation to a user. In the case where prior results may have been presented to a user during on the partial execution, the continued execution may cause the values displayed on the presentation to be updated.

In certain implementations, the cost component 112 may be programmed to estimate a cost associated with execution of the prioritized plan based on a partial execution of a remaining unexecuted portion of a prioritized plan. The prioritization component 114 may be programmed to compare this cost to the prior estimated costs of the non-prioritized plans. Based on the comparison, the prioritization component 114 may determine whether the cost of execution of a remaining unexecuted portion of a prioritized plan is greater or lower than the cost of a remaining unexecuted portion of one or more non-prioritized plans. In some implementations, the prioritization component 114 may determine that the cost of execution of a remaining unexecuted portion of a prioritized plan is greater than the cost of a remaining unexecuted portion of one or more non-prioritized plans. This may be attributed to, for example, unforeseen impacts of one or more cost factors, and/or an inaccurate estimation of the cost of the prioritized plan. If, for example, the estimated cost of a remaining unexpected portion of a prioritized plan is greater than an estimated cost for one or more non-prioritized plans, then the prioritization component 114 may be programmed to suspend or cancel execution of the remaining portion of a prioritized plan and execute a remaining unexecuted portion of a (next lowest cost) non-prioritized plan (e.g., via the query component 110). As such, the "prioritized" plan may become a "non-prioritized" plan, while next lowest cost "non-prioritized" plan may become a "prioritized" plan. However, in some implementations, the prioritization component 114 may determine that the cost of execution of a remaining unexecuted portion of a prioritized plan is lower than the cost of a remaining unexecuted portion of one or more non-prioritized plans. In this use case, the prioritization component 114 may be programmed to continue execution of the remaining portion of a prioritized plan.

It is noted that subsequent plan execution cancellations (or suspension) and continuations may be performed based on "on-the-fly" cost determinations. That is, after cancellation (or suspension) of a prioritized plan and continuation of a next lowest cost non-prioritized plan, an estimated (or actual) cost for execution of a remaining portion of the non-prioritized plan may be determined to be greater than an estimated cost for another non-prioritized plan. In such instances, the continued non-prioritized plan may be suspended while the next lowest cost non-prioritized plan may be continued.

In certain implementations, the profiling component 116 may be programmed to profile plans and/or data sources as a basis for estimating costs. Profiling plans may comprise collecting and/or monitoring actual costs associated with execution of the plans (herein referred to as "historical cost information") over one or more data sources. The historical cost information may be used to associate particular aspects (e.g., operations and/or groups of operations) of plans with historical costs for those aspects. In some implementations, the profiling may be based on aspects such as the particular operations of plan, a group of particular operations, and/or particular orders of operations of a plan, and how those aspects contributed to cost.

In certain implementations, profiling data sources may comprise determining values for performance metrics of a data source. The performance metrics may include one or more of an estimated number of rows of data in the data source, an average row length, a size on disk, if the data source is ordered, if the data source is partitioned, a partitioning scheme, cardinality of various attributes, the distribution of data over various time periods, net latency to the data source, net throughput to and/or from the data source, and/or other performance metric. Values of one or more of the metrics may be determined based on information obtained during the execution of queries (e.g., while historical cost information may be collected), and/or may be determined in other ways. The metrics may be associated with the historical cost in connection to the plan profiles. In certain implementations, the historical cost information may associate historical costs with various plan aspects as well as with particular metrics of the data source associated with the plans. This historical cost information may be beneficial in estimating costs for potential plans and/or plan aspects if the data source associated with a plan and/or particular aspects of a plan are known.

The optimizing component 118 may be programmed to organize and/or reorganize a plan based on historical cost information. A potential plan may be submitted by a system administrator or a potential plan may be provided in other ways. The cost component 112 may be programmed to determine an estimated cost of the potential plan based on historical cost information. The cost component 112 may be programmed to compare aspects of the potential plan with aspects within the historical cost information. Based on one or more matches, the aspects of the potential plan may be associated with the historical costs (based on the matched aspects). An estimated cost of a potential plan may be determined. In certain implementations, an estimated cost may simply be the sum of the associated historical costs. In certain implementations, one or more aspects may be given more or less weight than others for estimating a cost. For example, in certain implementations, one or more plan aspects and/or data source metrics may contribute more to the cost of executing a plan than other plan aspects, and/or one or more data source metrics may be given more (or less) weight than other data source metrics when estimating the cost for the plan. By way of non-limiting example, a latency metric may be given more weight than other metrics and/or plan aspects.

Based on the estimated cost, the optimizing component 118 may be programmed to reorganize the potential plan into one or more target plans associated with relatively lower estimated costs. Reorganization may include removing an operation that historically may be too costly, exchanging a costly operation with a different less costly operation or group of operations, and/or reordering a group of operations to be less costly. One or more target plans may then be submitted to the planning component 108.

Figure 6:
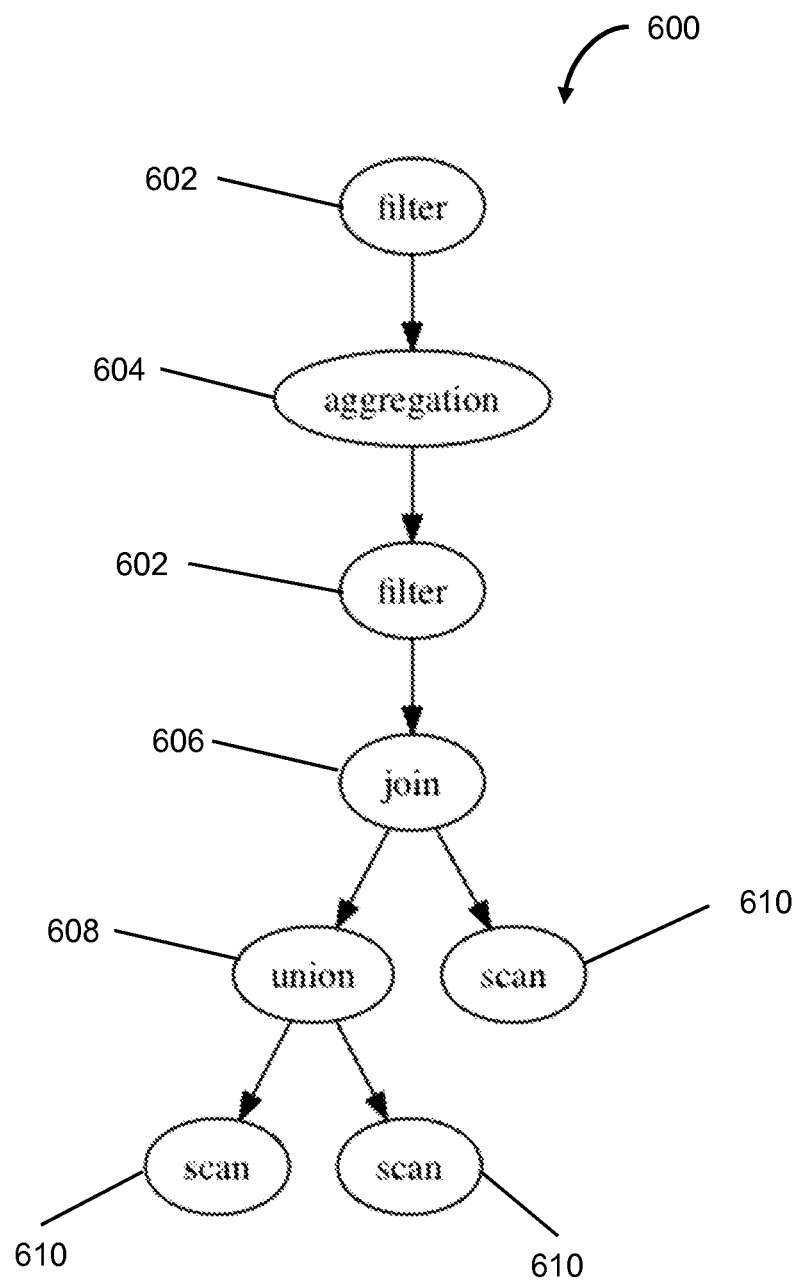
FIG. 6 illustrates a diagram of a plan for obtaining and/or processing data, in accordance with one or more implementations.

As an illustrative example in FIG. 6, a diagram of a plan 600 for obtaining and/or processing data is shown. In certain implementations, the plan 600 may in actually be written in structured query language (SQL) and/or other computer-readable language to define the various operations using corresponding semantics. Various operations or steps are shown generally as filter 602, aggregation 604, join 606, union 608, scan 610, sort (not shown in FIG. 6), and/or other operations. The filter 602 operation may operate to process a data stream in some order to produce a new data structure containing exactly those elements of the original data structure specified by the filter operation (e.g., by its predicate). Aggregation 604 may include any type of grouping operation to group data in accordance with the language semantics. Join 606 operation may operate to combine one or more streams of data together onto a single record. Types of join function include sort-merge join, hash join, nested loop join, windowed join, and/or other join operations. In certain implementations, a selection of a join operation for a particular query of a plan may be based on whether or not a data source is ordered, and/or may be based on some other factor which may contribute to cost of execution. Union 608 may comprise an operation to eliminate duplicate rows from a results set. Scan 610 may comprise a fetch for data from an underlying data source, for example, to return a location of the data. In certain implementations, a scan may search every row in a data source whether or not it qualifies such that a cost for this operation may be proportional to the total number of rows in the data source. A sort operation may operate to order data in ascending or descending order, and/or based on some other sorting criteria.

It is noted that the depiction of the plan 600 in FIG. 6 is provide for illustrative purposes only and is not to be considered limiting. For example, in certain implementations, different operations may be added or removed and/or the order in which the operations take place may be reorganized (e.g., via optimizing component).

Figure 2:
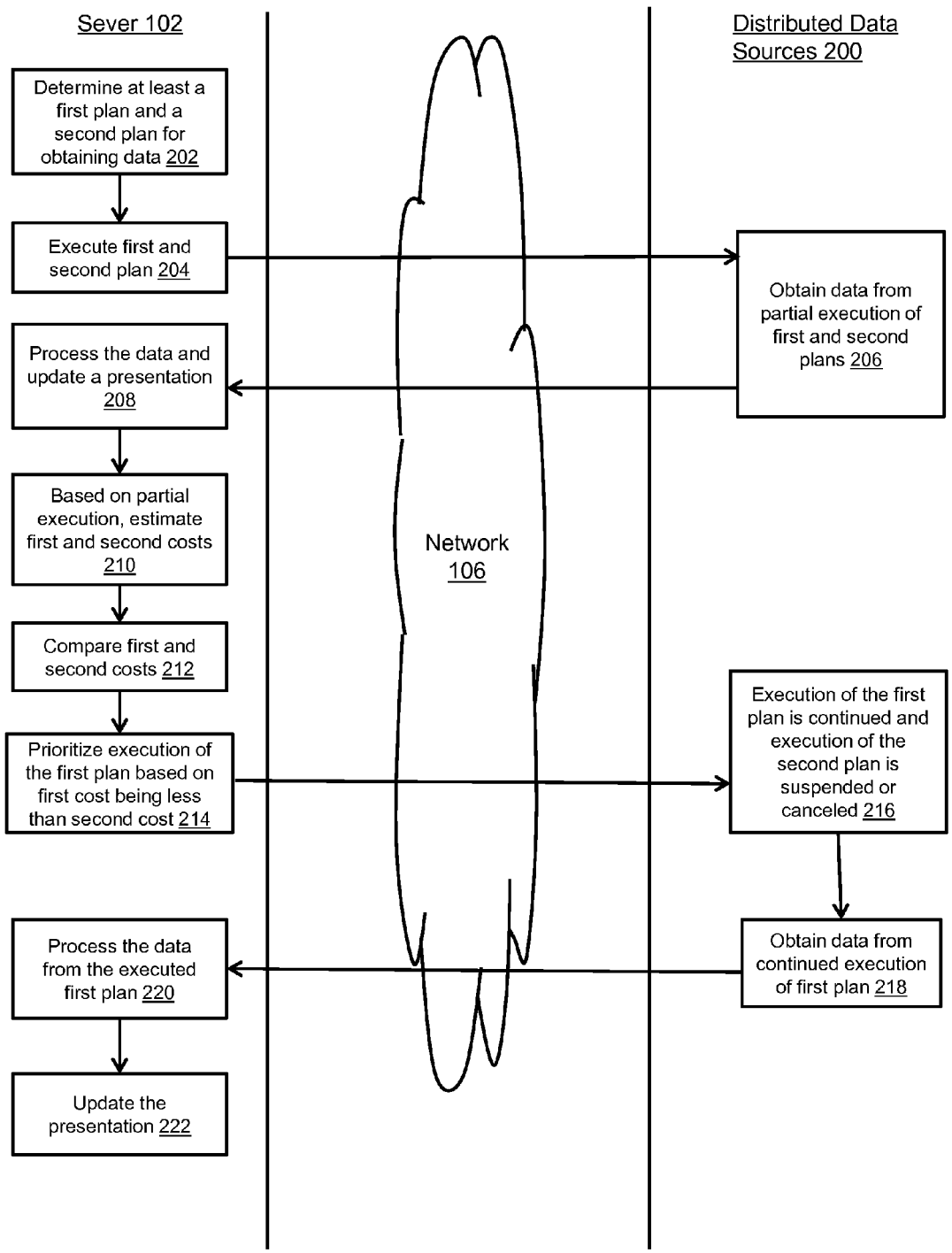
FIG. 2 illustrates a flow chart of information exchange between a server used in the system of FIG. 1 and data sources, in accordance with one or more implementations.

FIG. 2 illustrates an information exchange flow chart for prioritizing execution of plans based on partial execution of the plans, in accordance with one or more implementations.

The information may be exchanged between a server 102 (e.g., such as server 102 in FIG. 1) and one or more data sources (e.g., distributed data sources 200) over a network 106, such as the Internet.

In FIG. 2, at least a first plan and a second plan for obtaining and/or processing data from one or more data sources may be determined 202. The first and second plans may be executed 204 over a distributed (or localized) network of data sources 200. The first and second plans may be executed in parallel. After partial execution of the first and second plans, data may be obtained 206 from the corresponding data sources 200. The obtained data may be processed and/or used to present and/or update 222 a presentation (e.g., a data visualization of a requested data set) to a user. Next in 210, a first cost associated with the execution of the first plan may be estimated based on partial execution of the first plan, while a second cost associated with the execution of the second plan may be estimated based on partial execution of the second plan. The estimated costs may be compared 212.

In certain implementations, estimation of the first cost may comprise estimating, based on the partial execution of the first plan, a first delay associated with presenting a set of results related to a data set when the first plan is used. In certain implementations, estimation of the second cost may comprise estimating, based on the partial execution of the second plan, a second delay associated with presenting a set of results related to the data set when the second plan is used.

In certain implementations, estimation of the first cost may comprise estimating, based on the partial execution of the first plan, delays between updates to the presentation of a data set to a user when the first plan is used. In certain implementations, estimation of the second cost may comprise estimating, based on the partial execution of the second plan, delays between updates to a presentation of a data set to a user when the second plan is used.

In certain implementations, estimation of the first and/or second costs may be based on profiles of performance metrics associated with one or more of the data sources within the distributed network of data sources 200.

In certain implementations, estimation of the first cost may be based on historical cost information associated with one or more aspects of the first plan. In certain implementations, estimation of the second cost may be based on historical cost information associated with one or more aspects of the second plan.

In certain implementations, estimation of the first cost may be based on a first path utilized by the first plan to obtain and/or process data. In certain implementations, estimation of the second cost may be based on a second path utilized by the second plan to obtain and/or process data.

In certain implementations, based on the comparison indicating the first cost being less than the second cost, the execution of the first plan may be prioritized 214. As such, the remaining unexecuted portions of the first plan may be executed while the second plan may be suspended or canceled 216. Data from the continued execution of the remaining portion of the first plan may be obtained 218 from the distributed data sources 200. The data from the full execution of the first plan may be processed 220. The presentation may be updated 222 based on the results related to the processing of the data from the full execution of the first plan.

Figure 3:
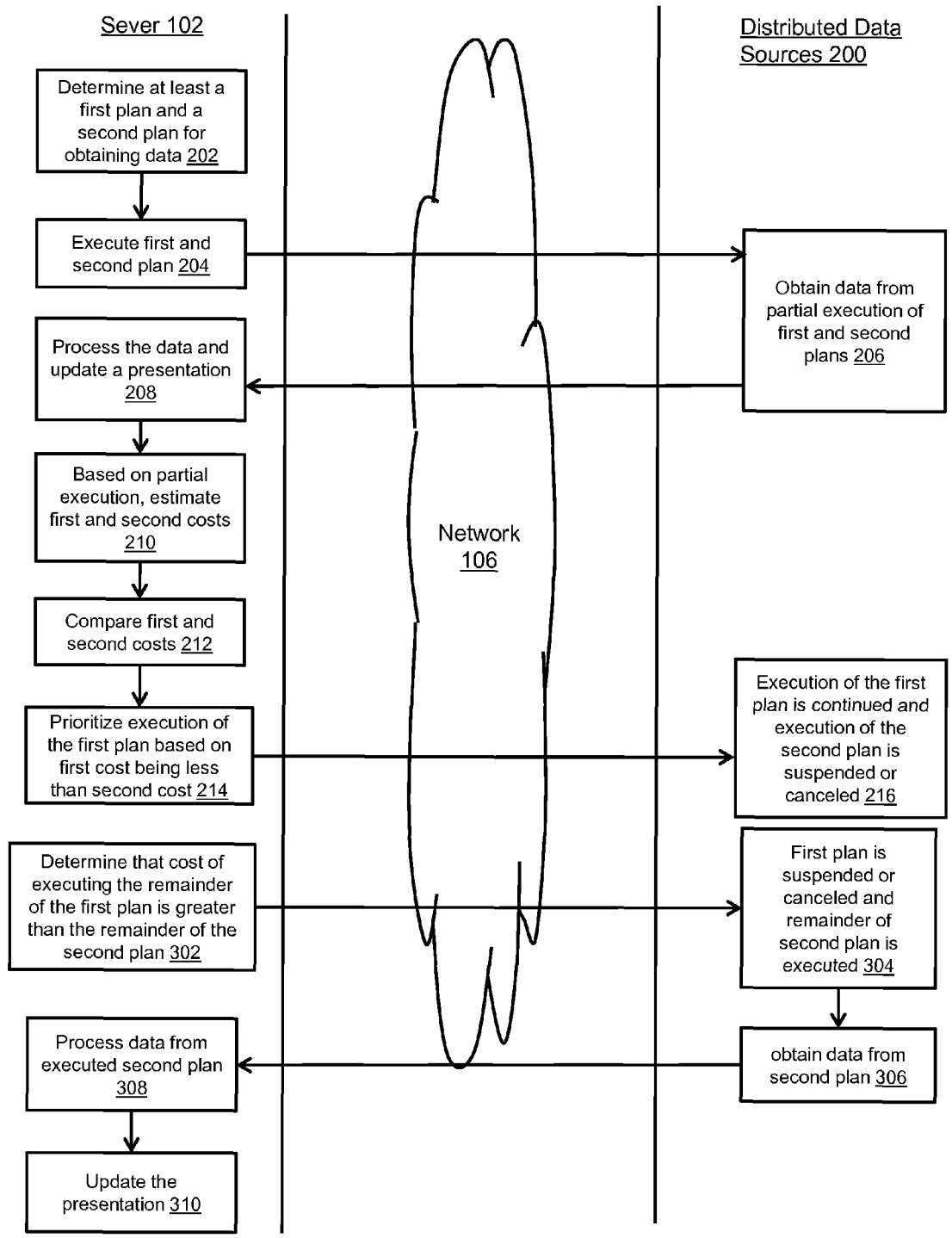
FIG. 3 illustrates a flow chart of information exchange between a server used in the system of FIG. 1 and data sources, in accordance with one or more implementations.

FIG. 3 illustrates an information exchange flow chart for prioritizing execution of query plans based on partial execution of the plans, in accordance with one or more implementations. The information may be exchanged between a server 102 (e.g., such as server 102 in FIG. 1) and one or more data sources (e.g., distributed data sources 200) over a network 106, such as the Internet.

In FIG. 3, the exchange of information may follow similarly to that of FIG. 2, up to and including the step where the remaining unexecuted portions of the first plan may be executed 216 based on the prioritization 214 of the first plan while the second plan may be suspended or canceled 216. In certain implementations, it may be determined 302 that the cost of executing the remaining unexecuted portion of the first plan may be greater than the cost of executing the remaining unexecuted portion of the second plan. In such scenarios, the execution of the remaining portion of first plan may be suspended while the remaining portion of the second plan may be executed in lieu of the remaining portion of the first plan 304. Data from the execution of the remaining portion of the second plan may be obtained 306 at the distributed data sources 200. The data may be processed 308 and used to update 310 a presentation (e.g., a data visualization of a requested data set) to a user.

Figure 4:
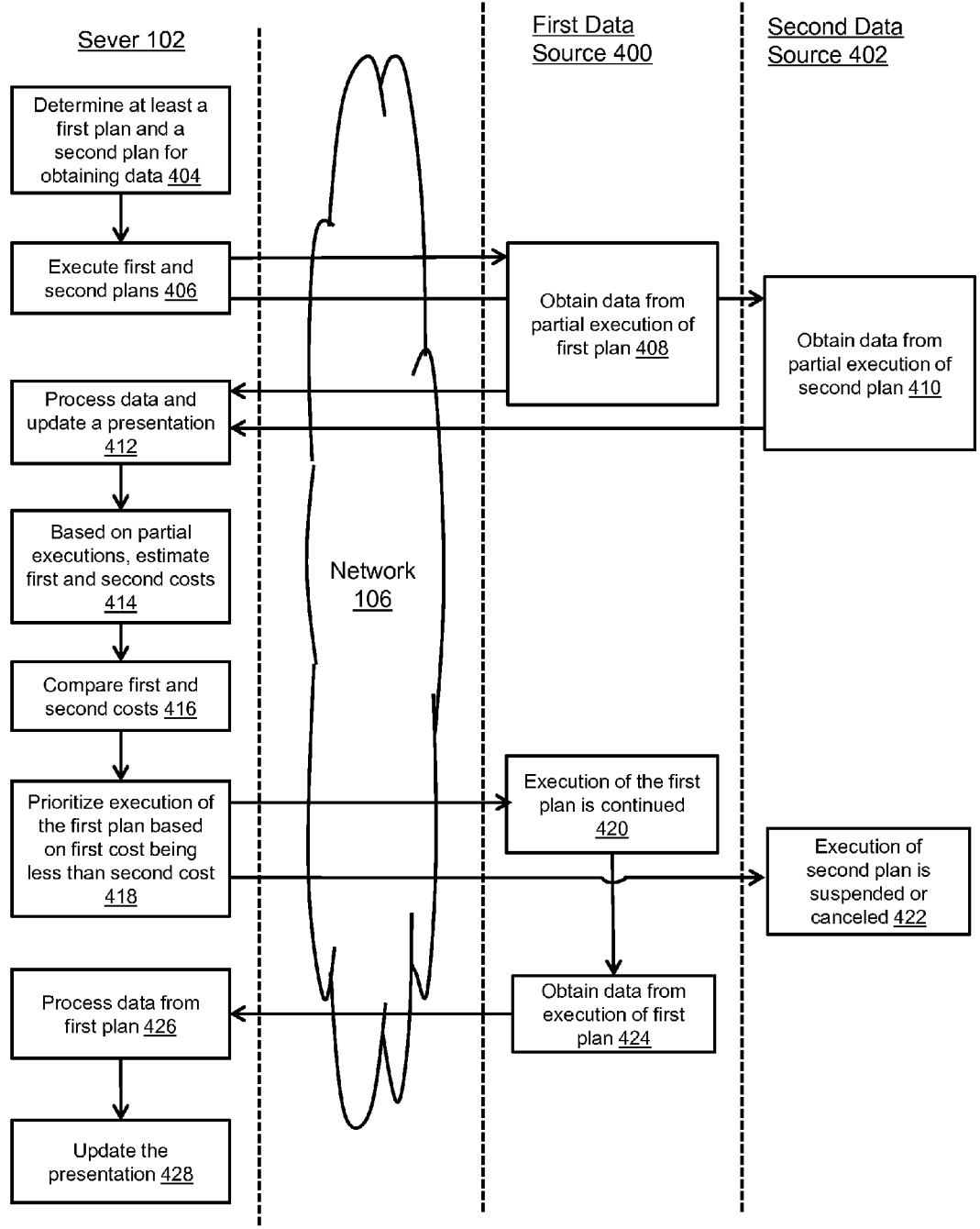
FIG. 4 illustrates a flow chart of information exchange between a server used in the system of FIG. 1 and first and second data sources, in accordance with one or more implementations.

FIG. 4 illustrates an information exchange flow chart for prioritizing execution of query plans based on partial execution of the plans, in accordance with one or more implementations. The information may be exchanged between a server 102 (e.g., such as server 102 in FIG. 1) and a first data source 400 and a second data source 402 over a network 106, such as the Internet.

In FIG. 4, at least a first plan and a second plan for obtaining and/or processing data from one or more data sources may be determined 404. The first and second plans may be executed 406. The first plan may comprise obtaining data from the first data source 400. The second plan may comprise obtaining data from the second data source 402. The first and second plans may be executed in parallel. After partial execution of the first and second plans, data may be obtained 408 from the first data source 400 in accordance with the first plan, while data may be obtained 410 from the second data source 402 in accordance with the second plan. The obtained data (from one or both of the first data source 400 or the second data source 402) may be processed and/or used to present and/or update 412 a presentation (e.g., a data visualization of a requested data set) to a user.

Based on the partial executions of the first and second plans, a first cost for the first plan and a second cost for the second plan may be estimated 414. The estimated costs may be compared 416. In certain implementations, based on the comparison indicating that the first cost may be less than the second cost, the execution of the first plan via the first data source 400 may be prioritized 418 over execution of the second plan via the second data source 402. As such, the remaining unexecuted portions of the first plan may be executed via the first data source 400 while execution of the second plan via the second data source 402 may be suspended or canceled 422. Data from the continued execution of the remaining portion of the first plan may be obtained 424 from the first data source 400. The data from the full execution of the first plan may be processed 426. The presentation may be updated 428 based on the results related to the processing of the data from the full execution of the first plan.

Returning to FIG. 1, user device 104 may comprise any type of mobile terminal, fixed terminal, and/or other device. For example, user device 104 may comprise a desktop computer, a notebook computer, a netbook computer, a tablet computer, a smartphone, a navigation device, an electronic book device, a gaming device, and/or any other user device. In some implementations, user device 104 may comprise the accessories and peripherals of these devices. User device 104 may also support any type of interface to the user (such as "wearable" circuitry, etc.).

Communication network 106 of system 100 may comprise one or more networks such as a data network, a wireless network, a telephony network, and/or other communication networks. A data network may comprise any local area network (LAN), metropolitan area network (MAN), wide area network (WAN), a public data network (e.g., the Internet), short range wireless network, and/or any other suitable packet-switched network. The wireless network may, for example, comprise a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), etc.).

The external resource(s) 105 may include sources of information that are outside of system 100, external entities participating with system 100 (e.g., distributed data sources, and/or other considerations), and/or other resources. In some implementations, some or all of the functionality attributed herein to external resource(s) 105 may be provided by resources included in system 100.

In some implementations, server 102 may include an electronic storage 122, one or more processors 124, and/or other components. Server 102 may include communication lines, or ports to enable the exchange of information with network 106 and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically store information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor 124, information received from server 102, information received from user device 104, and/or other information that enables server 102 to function as described herein. In some implementations, electronic storage may comprise a non-transitory, tangible computer-readable storage medium with an executable program stored thereon, wherein the program instructs a microprocessor to perform some or all of the functionality of components 108, 110, 112, 114, 116, 118, 120 and/or other components.

Processor 124 may be configured to provide information processing capabilities in server 102. As such, processor 124 may include a digital processor, an analog processor, a digital circuit designed to process information, an analog circuit designed to process information, a state machine, and/or other mechanisms for electronically processing information. Although processor 124 is shown in FIG. 1 as a single entity, this is for illustrative purposes only. In some implementations, processor 124 may include a plurality of processing units. These processing units may be physically located within the same device, or processor 124 may represent processing functionality of a plurality of devices operating in coordination. Processor 124 may be configured to execute components 108, 110, 112, 114, 116, 118, 120, and/or other components. Processor 124 may be configured to execute components 108, 110, 112, 114, 116, 118, 120, and/or other components by software; hardware; firmware; some combination of software, hardware, and/or firmware; and/or other mechanisms for configuring processing capabilities on processor 124.

It should be appreciated that although components 108, 110, 112, 114, 116, 118, and 120 are illustrated in FIG. 1 as being co-located within a single processing unit, in implementations in which processor 124 includes multiple processing units, components 108, 110, 112, 114, 116, 118, and/or 120 may be located remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than described. For example, components 108, 110, 112, 114, 116, 118, and/or 120 may be eliminated, and some or all of its functionality may be provided by other ones of components 108, 110, 112, 114, 116, 118, and/or 120. As another example, processor 124 may be configured to execute one or more additional components that may perform some or all of the functionality attributed below to one of components 108, 110, 112, 114, 116, 118, and/or 120.

Figure 7:
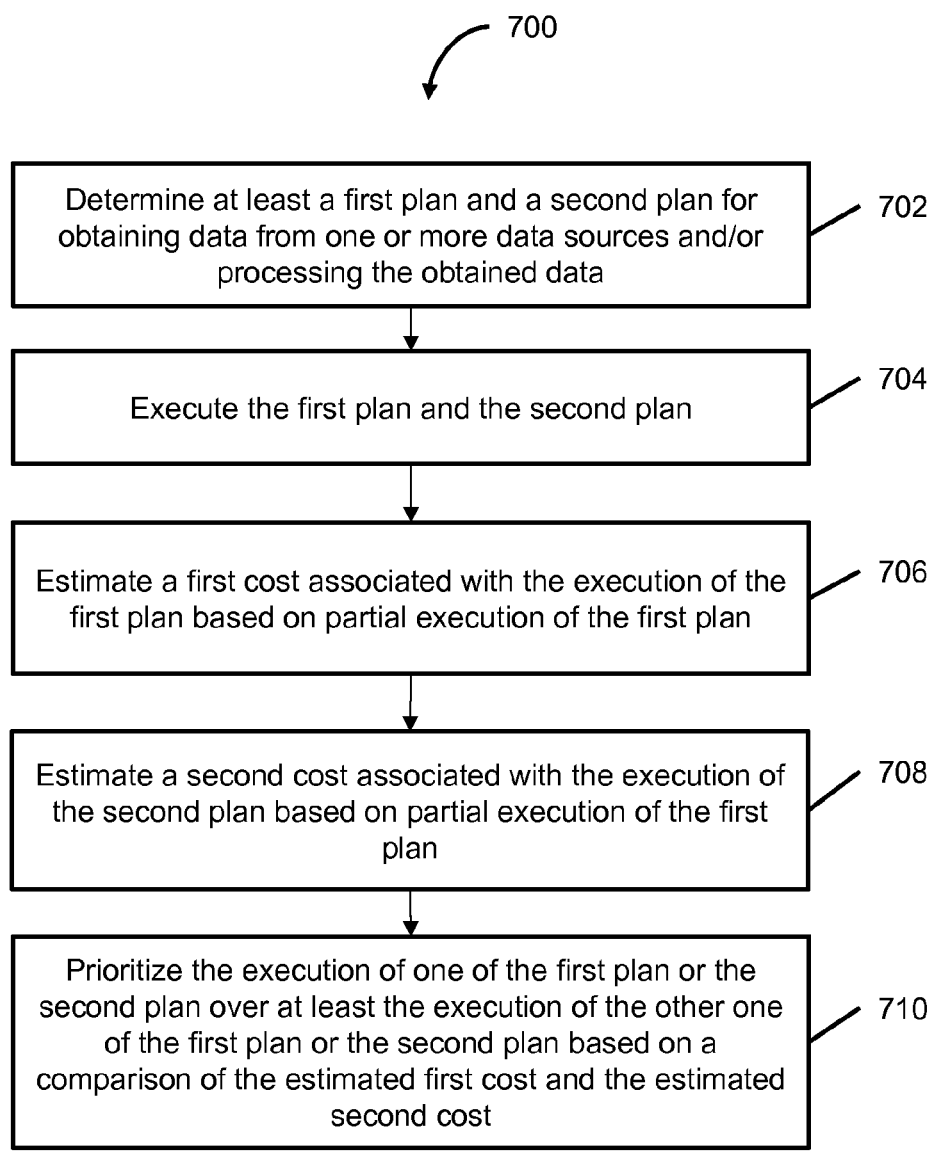
FIG. 7 illustrates a flowchart of processing operations for prioritizing execution of plans for obtaining and/or processing data based on partial execution of the plans, in accordance with one or more implementations.

FIG. 7 illustrates a flowchart of processing operations of prioritizing retrieval and/or processing of data, in accordance with one or more implementations. The operations of process 700 presented below are intended to be illustrative. In some implementations, process 700 may be accomplished with one or more additional operations not described, and/or without one or more of the operations discussed. Additionally, the order in which the operations of process 700 are illustrated in FIG. 7 and described below is not intended to be limiting.

In certain implementations, one or more operations of process 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 700 in response to instructions stored electronically on an electronic storage medium. The one or more processing devices may include one or more devices configured through hardware, firmware, and/or software to be specifically designed for execution of one or more of the operations of process 700.

In an operation 702, at least a first plan and a second plan for obtaining data from one or more data sources and/or processing the obtained data may be determined. Operation

702 may be performed by a planning component that is the same as or similar to planning component 108, in accordance with one or more implementations.

In an operation 704, the first plan and the second plan may be executed. Operation 704 may be performed by a query component that is the same as or similar to query component 110, in accordance with one or more implementations.

In an operation 706, a first cost associated with the execution of the first plan may be estimated based on partial execution of the first plan. Operation 706 may be performed by a cost component that is the same as or similar to cost component 112, in accordance with one or more implementations.

In an operation 708, a second cost associated with the execution of the second plan may be estimated based on partial execution of the second plan. Operation 708 may be performed by a cost component that is the same as or similar to cost component 112, in accordance with one or more implementations.

In an operation 710, the execution of one of the first plan or the second plan may be prioritized over at least the execution of the other one of the first plan or the second plan may be executed based on a comparison of the estimated first cost and the estimated second cost. Operation 710 may be performed by a prioritization component that is the same as or similar to prioritization component 114, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A computer-implemented method of prioritizing execution of plans for obtaining and/or processing data based on partial execution of the plans, the method being implemented by a computer system that includes one or more physical processors executing one or more computer program instructions which, when executed, perform the method, the method comprising:
    determining, by the computer system, at least a first plan and a second plan for obtaining data from one or more data sources and/or processing the obtained data, wherein the first plan comprises utilizing a first path to obtain results related to at least one data set from a data source, and the second plan comprises utilizing a second path different from the first path to obtain results related to the at least one data set from the data source;
    executing, by the computer system, the first plan and the second plan;
    estimating, by the computer system, based on partial execution of the first plan, a first cost for fully executing the first plan, wherein the estimation of the first cost comprises estimating, based on the partial execution of the first plan, a first delay associated with presenting a set of results related to a data set when the first plan is used such that the first cost is estimated based on the estimated first delay;
    estimating, by the computer system, based on partial execution of the second plan, a second cost for fully executing the second plan, wherein the estimation of the second cost comprises estimating, based on the partial execution of the second plan, a second delay associated with presenting a set of results related to the data set when the second plan is used such that the second cost is estimated based on the estimated second delay, and wherein the first cost and the second cost are estimated after the execution of the first plan and the execution of the second plan have begun and before the execution of the first plan and the execution of the second plan are completed; and
    prioritizing, by the computer system, the execution of one of the first plan or the second plan over at least the execution of the other one of the first plan or the second plan based on a comparison of the estimated first cost and the estimated second cost, wherein the prioritization occurs after the execution of the first plan and the execution of the second plan have begun and before the execution of the first plan and the execution of the second plan are completed.

2. The method of claim 1, wherein the execution of the first plan is prioritized over at least execution of the second plan based on the comparison indicating that the estimated first cost is less than the estimated second cost, the method further comprising:
    continuing, by the computer system, the execution of the first plan based on the prioritization; and
    suspending or canceling, by the computer system, the execution of the second plan based on the prioritization.

3. The method of claim 1, further comprising:
    estimating, by the computer system, based on the partial execution of the first plan, a percentage of the first plan that has been executed; and
    estimating, by the computer system, based on the partial execution of the second plan, a percentage of the second plan that has been executed,
    wherein the first cost for fully executing the first plan is estimated based on a cost of the partial execution of the first plan and the percentage of the first plan that has been executed, and
    wherein the second cost for fully executing the second plan is estimated based on a cost of the partial execution of the second plan and the percentage of the second plan that has been executed.

4. The method of claim 1, wherein the first plan comprises obtaining results related to a data set from a first data source before obtaining results related to the data set from a second data source, and the second plan comprises obtaining results related to the data set from the second data source before obtaining results related to the data set from the first data source.

5. The method of claim 1, wherein the first plan comprises obtaining results related to a given data set from a data source that is not utilized in the second plan for obtaining results related to the given data set.

6. The method of claim 1, further comprising:
    estimating, based on the partial execution of the first plan, first delays between updates to a presentation of a data set to a user when the first plan is used; and
    estimating, based on the partial execution of the second plan, second delays between updates to a presentation of a data set to a user when the second plan is used,
    wherein the first cost for fully executing the first plan is estimated based on the estimated first delays, and
    wherein the second cost for fully executing the second plan is estimated based on the estimated second delays.

7. The method of claim 1, wherein estimating the first cost is based on predefined performance metrics associated with a first data source that is utilized in the first plan, and wherein estimating the second cost is based on predefined performance metrics associated with a second data source that is utilized in the second plan.

8. The method of claim 7, wherein the predefined performance metrics comprise one or both of latency and throughput of data through the data sources.

9. The method of claim 1, wherein estimating the first cost is based on historical cost information associated with one or more aspects of the first plan, and wherein estimating the second cost is based on historical cost information associated with one or more aspects of the second plan.

10. The method of claim 1, wherein the first plan and the second plan are executed in parallel before the prioritization.

11. The method of claim 10, wherein the first cost is estimated based on the partial execution of the first plan that occurred in parallel with the execution of the second plan, and the second cost is estimated based on the partial execution of the second plan that occurred in parallel with the execution of the first plan.

12. A system for prioritizing execution of plans for obtaining and/or processing data based on partial execution of the plans, the system comprising:
one or more physical processors programmed to execute one or more computer program instructions which, when executed, cause the one or more physical processors to:
determine at least a first plan and a second plan for obtaining data from one or more data sources and/or processing the obtained data, wherein the first plan comprises utilizing a first path to obtain results related to at least one data set from a data source, and the second plan comprises utilizing a second path different from the first path to obtain results related to the at least one data set from the data source;
execute the first plan and the second plan;
estimate, based on partial execution of the first plan, a first cost for fully executing the first plan, wherein the estimation of the first cost comprises estimating, based on the partial execution of the first plan, a first delay associated with presenting a set of results related to a data set when the first plan is used such that the first cost is estimated based on the estimated first delay;
estimate, based on partial execution of the second plan, a second cost for fully executing the second plan, wherein the estimation of the second cost comprises estimating, based on the partial execution of the second plan, a second delay associated with presenting a set of results related to the data set when the second plan is used such that the second cost is estimated based on the estimated second delay, and wherein the first cost and the second cost are estimated after the execution of the first plan and the execution of the second plan have begun and before the execution of the first plan and the execution of the second plan are completed; and
prioritize the execution of one of the first plan or the second plan over at least the execution of the other one of the first plan or the second plan based on a comparison of the estimated first cost and the estimated second cost, wherein the prioritization occurs after the execution of the first plan and the execution of the second plan have begun and before the execution of the first plan and the execution of the second plan are completed.

13. The system of claim 12, wherein the execution of the first plan is prioritized over at least execution of the second plan based on the comparison indicating that the estimated first cost is less than the estimated second cost, and wherein the one or more physical processors are further caused to:
continue the execution of the first plan based on the prioritization; and
suspend or cancel the execution of the second plan based on the prioritization.

14. The system of claim 12, wherein the one or more physical processors are further caused to:
estimate, based on the partial execution of the first plan, a percentage of the first plan that has been executed; and
estimate, based on the partial execution of the second plan, a percentage of the second plan that has been executed,
wherein the first cost for fully executing the first plan is estimated based on a cost of the partial execution of the first plan and the percentage of the first plan that has been executed, and
wherein the second cost for fully executing the second plan is estimated based on a cost of the partial execution of the second plan and the percentage of the second plan that has been executed.

15. The system of claim 12, wherein first plan comprises obtaining results related to a data set from a data source, and the second plan comprises obtaining results related to the data set from the data source.

16. The system of claim 15, wherein the first plan comprises utilizing a first path to obtain results related to the data set from the data source, and the second plan comprises utilizing a second path different than the first path to obtain results related to the data set from the data source.

17. The system of claim 12, wherein the first plan comprises obtaining results related to a data set from a first data source before obtaining results related to the data set from a second data source, and the second plan comprises obtaining results related to the data set from the second data source before obtaining results related to the data set from the first data source.

18. The system of claim 12, wherein the first plan comprises obtaining results related to a given data set from a data source that is not utilized in the second plan for obtaining results related to the given data set.

19. A computer-implemented method of prioritizing execution of plans for obtaining and/or processing data based on partial execution of the plans, the method being implemented by a computer system that includes one or more physical processors executing one or more computer program instructions which, when executed, perform the method, the method comprising:
determining, by the computer system, at least a first plan and a second plan for obtaining data from one or more data sources and/or processing the obtained data, wherein the first plan comprises utilizing a first path to obtain results related to at least one data set from a data source, and the second plan comprises utilizing a second path different from the first path to obtain results related to the at least one data set from the data source;
executing, by the computer system, the first plan and the second plan;
estimating, by the computer system, based on partial execution of the first plan, a first cost for fully executing the first plan wherein the estimation of the first cost comprises estimating, based on the partial execution of the first plan, first delays between updates to a presentation of a data set to a user when the first plan is used such that the first cost is estimated based on the estimated first delays;

estimating, by the computer system, based on partial execution of the second plan, a second cost for fully executing the second plan, wherein the estimation of the second cost comprises estimating, based on the partial execution of the second plan, second delays between updates to a presentation of a data set to a user when the second plan is used such that the second cost is estimated based on the estimated second delays, and wherein the first cost and the second cost are estimated after the execution of the first plan and the execution of the second plan have begun and before the execution of the first plan and the execution of the second plan are completed; and prioritizing, by the computer system, the execution of one of the first plan or the second plan over at least the execution of the other one of the first plan or the second plan based on a comparison of the estimated first cost and the estimated second cost, wherein the prioritization occurs after the execution of the first plan and the execution of the second plan have begun and before the execution of the first plan and the execution of the second plan are completed.

20. The method of claim 19, wherein the execution of the first plan is prioritized over at least execution of the second plan based on the comparison indicating that the estimated first cost is less than the estimated second cost, the method further comprising:

continuing, by the computer system, the execution of the first plan based on the prioritization; and suspending or canceling, by the computer system, the execution of the second plan based on the prioritization.

21. The method of claim 19, further comprising:

estimating, by the computer system, based on the partial execution of the first plan, a percentage of the first plan that has been executed; and estimating, by the computer system, based on the partial execution of the second plan, a percentage of the second plan that has been executed, wherein the first cost for fully executing the first plan is estimated based on a cost of the partial execution of the first plan and the percentage of the first plan that has been executed, and wherein the second cost for fully executing the second plan is estimated based on a cost of the partial execution of the second plan and the percentage of the second plan that has been executed.

22. The method of claim 19, wherein the first plan comprises obtaining results related to a given data set from a data source that is not utilized in the second plan for obtaining results related to the given data set.

23. The method of claim 19, wherein the first plan and the second plan are executed in parallel before the prioritization.

24. The method of claim 23, wherein the first cost is estimated based on the partial execution of the first plan that occurred in parallel with the execution of the second plan, and the second cost is estimated based on the partial execution of the second plan that occurred in parallel with the execution of the first plan.

\* \* \* \* \*